United States Patent [19]

Thakur et al.

[11] 4,247,312

[45] Jan. 27, 1981

[54] DRILLING FLUID CIRCULATION SYSTEM

[75] Inventors: Pramod C. Thakur, Morgantown; Charles E. Mason, Fairmont, both of W. Va.; Stephen D. Lauer, Waynesburg, Pa.; Emrys H. Jones, Jr., Westover, W. Va.

[73] Assignee: Conoco, Inc., Ponca City, Okla.

[21] Appl. No.: 12,635

[22] Filed: Feb. 16, 1979

[51] Int. Cl.³ .............................................. B01D 19/00
[52] U.S. Cl. ...................................... 55/166; 55/193; 55/206; 175/206; 210/522
[58] Field of Search ................................... 55/164–167, 55/174–176, 193, 206; 175/206, 207, 66; 209/155, 156, 157, 490–494; 210/84, 188, 298, 521, 522

[56] References Cited

U.S. PATENT DOCUMENTS

| | | | |
|---|---|---|---|
| 1,999,291 | 4/1935 | Schultz et al. | 175/206 X |
| 2,555,314 | 6/1951 | Buckley et al. | 175/206 |
| 2,941,783 | 6/1960 | Stinson | 175/206 |
| 3,672,127 | 6/1972 | Mayse et al. | 55/174 |
| 3,706,384 | 12/1972 | Weijman-Hane | 210/522 X |

FOREIGN PATENT DOCUMENTS 619853  1/1927  France ...................................... 210/522

*Primary Examiner*—Charles N. Hart
*Assistant Examiner*—Richard W. Burks
*Attorney, Agent, or Firm*—Richard W. Collins

[57] ABSTRACT

A drilling fluid circulation system for containing drilling cuttings, gas and drilling fluid in a closed loop. The system includes a separator having two sealed compartments, one for settling out drilling cuttings and one for holding clean drilling fluid. A fine solids separator is provided between the two compartments, and a gas exhaust line for conducting gas released from the returning drilling fluid is provided to conduct the produced gas to a safe location away from the working area. A solids discharge device is provided for removing settled drilling cuttings.

6 Claims, 4 Drawing Figures

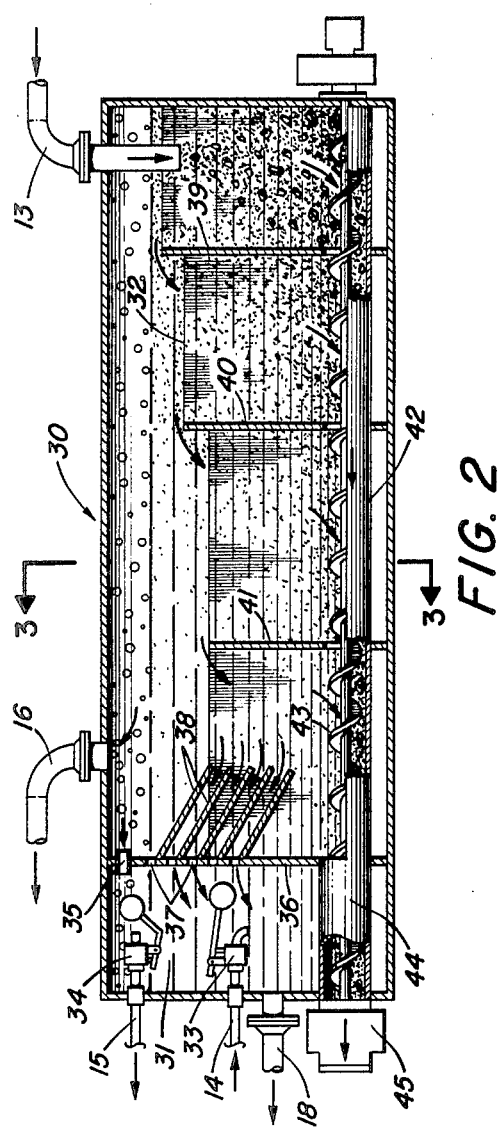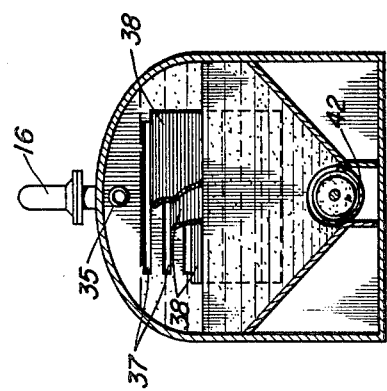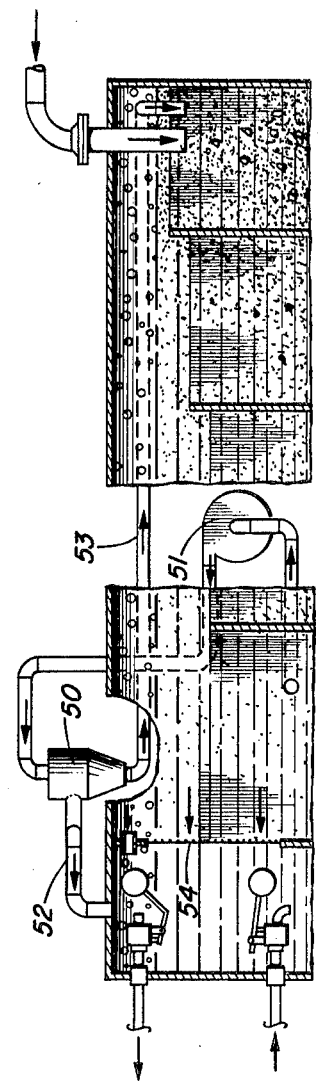
FIG. 2
FIG. 3
FIG. 4

DRILLING FLUID CIRCULATION SYSTEM

BACKGROUND OF THE INVENTION

1. Field of the Invention

This invention relates to a drilling fluid circulation system, and more particularly to a closed loop circulation system including a separator for handling drilling fluid and its associated drilling cuttings and produced gas.

2. The Prior Art

Much of the drilling fluid technology was developed by the oil and gas industry. Typically, a drilling mud is pumped down a drill string in a well being drilled from the surface, circulated back up the outside of the drill string to an open tank or reservoir at the surface, and recirculated down the drill string. Usually the return discharge empties into an open screen or other cuttings-removal device.

Horizontal drilling in coal mines has been investigated recently as a technique for degasification of a coal seam in advance of mining. Drilling of one or more boreholes a distance of 300 meters or more into a coal seam and recovering methane therefrom significantly reduces the methane concentration in the working area of a mine during later mining of the seam.

One of the problems encountered in horizontal drilling through a coal seam is that the working area is relatively small and enclosed, such that gas produced from the borehole being drilled, if released into the working area, presents a significant hazard. Prior art attempts to solve this problem have employed a liquid seal in the drilling fluid circulation system that forms a barrier between the mine atmosphere and the gas discharge point. However, because of surges in the gas flow this type of liquid seal was often blown out or made ineffective due to being plugged by drill cuttings.

The present invention overcomes these problems by providing a closed loop system for containing drill cuttings, gas and clean drilling fluid in a way to ensure safe and efficient separation. The closed system is desirable to prevent spillage of the drilling fluid and release in the working area of the gas produced while drilling.

SUMMARY OF THE INVENTION

According to the present invention, a closed loop circulation system is provided for handling the drilling fluid used with a drilling system adapted for drilling horizontal boreholes in an underground coal seam. The system of this invention is a closed system such that associated gas produced during the drilling is not released in the working area. The separation system of this invention eliminates the need for a gas trap as used in the prior art. All of the drilling fluid is contained in sealed compartments, and separation of the drill cuttings is accomplished within one of the compartments. Liquid level control means are utilized to maintain the drilling fluid level within a predetermined range in the compartments, and a discharge device for the drill cuttings which are separated from the fluid is provided.

BRIEF DESCRIPTION OF THE DRAWINGS

FIG. 2 is a side elevation, partially broken away, showing a preferred embodiment of a separator according to the invention.

FIG. 3 is a cross-section taken along the line 3—3 of FIG. 2.

FIG. 4 is a side elevation, partially cut away, showing another embodiment of a separator according to the invention.

DESCRIPTION OF THE PREFERRED EMBODIMENTS

Figure 1:
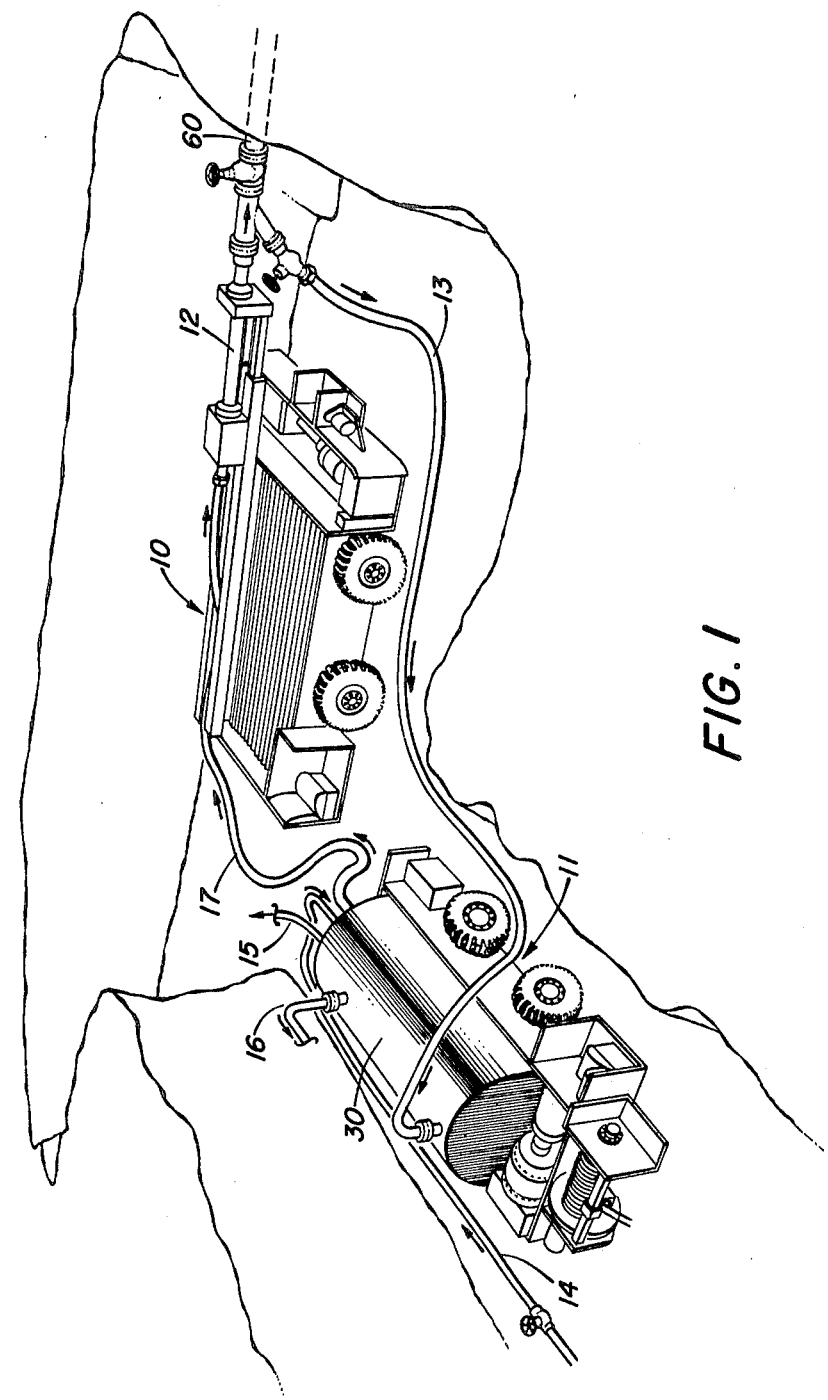
FIG. 1 is an illustration of a drilling system of the type to which the present invention pertains.

This invention is particularly useful in drilling long horizontal degasification holes in a coal seam in advance of mining the seam to reduce the methane concentration in the working area during mining. A drilling system for drilling such horizontal holes in an underground mine is illustrated in FIG. 1.

In FIG. 1, a drilling system including a drill unit 10 and a tender car 11 are shown in the working area of an underground mine. The drill unit 10 provides thrust and torque to drill string 12, and drilling fluid circulates from the tender car 11 down through supply line 17 to drill string 12 and back up the outside of drill string 12 through return line 13 to separator 30 on tender car 11. Make-up drilling fluid line 14, overflow drilling fluid line 15 and gas exhaust line 16 all connect to separator 30, which will be described in more detail below.

The drilling system as described above is only one version to which the present invention applies. For example, the closed-loop separation system described in detail below could also be utilized with a downhole motor drilling system and could be used for drilling in other than coal seams. However, the invention is especially suitable for drilling horizontal degasification holes in coal seams.

In drilling degasification holes, the operation is generally conducted in an underground room as indicated in FIG. 1. During drilling, methane gas from the coal seam escapes into the drilling fluid being circulated. It is desirable that this associated gas not be released in the working environment, and this invention provides a closed-loop circulation system designed to assure that the associated gas produced during the drilling operation does not get released in the working area.

The preferred embodiment of a separator for use in the closed-loop recirculation system of this invention is shown in detail in FIGS. 2 and 3. Another preferred embodiment of the separator is shown in FIG. 4.

As shown in FIGS. 2 and 3, separator 30 includes a clean fluid compartment 31 and a settling compartment 32. Clean fluid compartment 31 includes a low level control valve 33 connected to make-up fluid line 14 to maintain the liquid level in separator 30 above the outlet 18 leading to the suction of a circulation pump (not shown) for supplying drilling fluid to drill string 12. Clean fluid compartment 31 also includes a high level control valve 34 associated with overflow line 15 to maintain liquid-free upper gas-containing sections in compartments 31 and 32.

A pressure equalizing port 35 in the wall 36 between compartments 31 and 32 allows for free flow of gas between the compartments. Wall 36 also has a plurality of horizontal slots 37 (FIG. 3) to allow passage of cleaned drilling fluid from settling compartment 32 to clean fluid compartment 31. As shown in FIGS. 2 and 3, a series of separator plates 38 extend at an incline downwardly from below each slot 37 in wall 36 to effect separation of fine cuttings material from drilling fluid flowing from settling compartment 32 to clean fluid compartment 31.

Drilling fluid containing drilling cuttings and associated gas enters compartment 32 through return line 13. Compartment 32 has a series of baffles 39, 40 and 41 along its length. Coarse drilling cuttings settle in the chambers formed by these baffles, and partially cleaned fluid flows over the baffles toward wall 36. Gas contained in the returning drilling fluid is released and collects in the upper sections of compartments 31 and 32. The gas is then vented through gas exhaust line 16 to a safe location away from the working area. The bottom of separator 30 has a solids removal device including an open trough 42 in compartment 32 for collecting settled drilling cuttings. An auger 43 is provided for removing accumulated cuttings through closed conduit 44 under compartment 31 to cuttings discharge 45.

In the embodiment shown in FIG. 4, the parts of the separator are generally the same as the version shown in FIGS. 2 and 3 except that instead of the plate separator a centrifugal separator 50 is used to remove fine cuttings from the circulating drilling fluid. A pump 51 draws fluid from the settling compartment and pumps it to centrifugal separator 50 where clean fluid is taken off through line 52 and put in the clean fluid compartment while solids-containing fluid is returned through line 53 to the settling compartment. Instead of the series of slots 37 as used in the embodiment in FIGS. 2 and 3, a fine screen 54 is provided between the compartments to maintain a uniform fluid level in each compartment while keeping fine cuttings out of the clean fluid compartment.

The operation of a drilling system in accordance with the invention will now be described.

A drilling unit 10 is positioned in a mine working area. A tender car 11 which provides hydraulic power and other auxiliary services to the drilling unit is located nearby. A casing 60 is cemented or otherwise fixed in position in the initial part of a borehole, and a drilling fluid return line 13 is attached to a connection coming off casing 60. Clean drilling fluid from separator 30 is pumped through line 17 to drillstring 12 as the drilling unit is being used to drill the borehole. The drilling unit 10 or other conventional drilling unit is operated in a known manner to form a long generally horizontal borehole in the coal seam. As the hole progresses, drilling cuttings and associated gas are returned along with the circulating drilling fluid through return line 13 to separator 30 where cuttings and gas are removed and clean drilling fluid is circulated back to the drilling unit 10. The gas associated with the returning drilling fluid is withdrawn through gas exhaust line 16 and vented to a safe location such as an aboveground location. Additional drilling fluid is provided by a make-up line 14 to maintain the amount of drilling fluid sufficient to fill the hole as it is drilled and to enable operation of the separator 30.

The operation of separator 30 as shown in FIGS. 2 and 3 will now be described. Returning circulating fluid including drill cuttings and associated gas enter separator 30 through return line 13. The heavier cuttings settle immediately to the bottom of the separator and are collected in the trough 42 for later removal. Partially clarified drilling fluid overflows baffle 39 and additional drilling cuttings settle to the trough 42. The circulating fluid serially overflows baffles 39, 40 and 41 until it reaches the section occupied by separator plates 38. The fluid then moves upwardly over separator plates 38 and through slots 37 into the clean fluid compartment 31. Unsettled fines collect on the plates 38 and are not transferred into compartment 31. The associated gas from the drilling fluid is exhausted through line 16 to a safe location, preferably above ground. The fluid level in separator 30 is maintained within a desired range by low level control 33 which provides make-up fluid to the separator, and by high level control 34 which prevents the liquid level from approaching gas exhaust line 16. At the end of a working shift, or whenever the level of settled cuttings requires it, the auger 43 is operated and settled cuttings are removed through cuttings discharge 45.

The operation of the version of the separator illustrated in FIG. 4 is identical to the above-described operation except that centrifugal separator 50 and screen 54 are used in place of the separator plates 38 and slots 37 to remove fine cuttings and maintain a uniform liquid level between the two compartments.

A pressure-relief valve (not shown) may be provided to protect against the gas exhaust line 16 becoming plugged, although the separator 30 is designed to handle a substantial pressure. Numerous other modifications, additions and variations could be utilized in the invention. For example, the fine cuttings removal means could be a series of progressively smaller screens between the two compartments, and mechanisms other than the auger could be utilized to remove the settled cuttings from the separator. Such modifications and variations are to be considered within the scope of the invention as defined in the appended claims.

We claim:

1. In a drilling system comprising (1) a drill unit for drilling from an underground room and for providing horizontal thrust to a drill bit, and (2) a drilling fluid circulation system for providing liquid drilling fluid through a drill string to a drill bit and for returning said fluid, cuttings and produced gas through a borehole to a gas and cuttings separation system, the improvement wherein said gas and cuttings separation system is a closed loop system comprising:

(a) a first compartment for storing clean liquid drilling fluid;

(b) a second compartment having an inlet for receiving drilling fluid, drilling cuttings and produced gas from said drilling fluid circulation system and said second compartment including a plurality of baffles therein;

(c) connecting means between said first and second compartments, said connecting means including fluid passage means allowing liquid drilling fluid to flow from said second compartment to said first compartment;

(d) liquid level control means for maintaining a minimum liquid level in said compartments;

(e) liquid level control means for limiting the upper level of liquid in said compartments;

(f) gas-containing sections in the upper part of said compartments;

(g) gas communication means providing for free passage of gas between the said gas-containing sections;

(h) gas exhaust means for removing gas from said gas-containing sections and exhausting it at a location outside said underground room;

(i) cuttings removal means comprising an auger positioned in the bottom of said second compartment and including a cuttings discharge outlet for removing settled cuttings from said second compartment; and (j) outlet means for returning said liquid drilling fluid to said drilling fluid circulation system.

2. A drilling system according to claim 1 wherein said fine cuttings separation means includes a screen between said first and second compartments.

3. A drilling system according to claim 1 wherein said connecting means between said first and second compartments comprises a common wall having fluid passage means therethrough.

4. A drilling system according to claim 3 wherein said fine cuttings separation means is a centrifugal separator having a feed line extending from said second compartment, a clean liquid discharge line extending to said first compartment, and a solids-containing discharge line extending to said second compartment.

5. A drilling system according to claim 3 wherein said fine cuttings separation means is a plate separator means having at least one plate member downwardly inclined and extending from the common wall between said first and second compartment below the fluid passage means therethrough whereby liquid flowing from said second to said first compartment must pass upwardly over said plate member.

6. A drilling system according to claim 5 wherein said fluid passage means is a plurality of openings through said common wall and said plate separator means includes a plate extending from the common wall below each of said plurality of openings.

* * * * *